United States Patent [19]
Chung

[11] Patent Number: 5,642,983
[45] Date of Patent: Jul. 1, 1997

[54] SAIL SYSTEM FOR WIND TURBINES

[76] Inventor: Jung Han Chung, Jukong Apt. 704-111, Dungchon-dong, Kangseo-ku, Seoul, Rep. of Korea

[21] Appl. No.: 562,271

[22] Filed: Nov. 22, 1995

[30] Foreign Application Priority Data

Nov. 26, 1994 [KR] Rep. of Korea ............... 1994-31375

[51] Int. Cl.$^6$ ................................................ F03D 3/06
[52] U.S. Cl. ..................... 416/119; 416/136; 416/140; 416/197 A; 416/236 R
[58] Field of Search ........................... 416/119, 136, 416/139, 140, 197 A, 223 R, 235, 236 R, 237, DIG. 9, 236 A

[56] References Cited

U.S. PATENT DOCUMENTS

| | | | |
|---|---|---|---|
| 588,143 | 8/1897 | Hall | 416/119 |
| 692,714 | 2/1902 | Sala et al. | 416/197 A |
| 867,990 | 10/1907 | Miles | 416/136 |
| 1,714,808 | 5/1929 | Oliphant | 416/119 |
| 4,543,836 | 10/1985 | Call | 416/197 A |

*Primary Examiner*—Christopher Verdier
*Attorney, Agent, or Firm*—Shlesinger, Arkwright & Garvey LLP

[57] ABSTRACT

A sail system for wind turbines of the vertical shaft type is disclosed. The sail system has a vertical rotating shaft, a plurality of support arms radially extending from an upper portion of the rotating shaft, and a sail pivoted to the tip of each support arm. The sail is provided with a longitudinal horizontal slit and is eccentrically pivoted to the tip of each support arm by means of a hinge. A holding rod is pivoted to an outside portion of the arm and penetrates the longitudinal slit of the sail. A spring is fitted over the holding rod between the spring stopper of the holding rod and the outer surface of the sail. The sail system not only prevents the sail from sagging due to the sail's weight, it also tightly pivots the sail to the arm regardless of the sail's configurations. The maximum turning angle of the sail relative to the arm is limited and adjusted by the spring.

4 Claims, 4 Drawing Sheets

SAIL SYSTEM FOR WIND TURBINES

BACKGROUND OF THE INVENTION

1. Field of the Invention

The present invention relates in general to a sail system for wind turbines of the vertical shaft type designed to convert wind energy into electrical energy and, more particularly, to a structural improvement in a sail system for the vertical shaft type wind turbines including a plurality of plate sails rotatably mounted to a support frame.

2. Description of the Prior Art

As well known to those skilled in the art, typical wind turbines are generally classified into two types, that is, the wind turbines of the horizontal and vertical shaft types. The vertical shaft type wind turbines are operated by the force of wind against sails rotating about a vertical rotating shaft, thereby converting wind energy into electrical energy. FIG. 4 is a perspective view showing the construction of a typical sail system for vertical type wind turbines. As shown in the drawing, a plate sail 1 is rotatably mounted to a support arm 2 of a support frame. When the arm 2 of the above sail system is placed at a position where the arm 2 may rotate in the direction $R_1$ opposite to wind direction W', the sail 1 is turned to the direction $R_2$, which is the same as wind direction W', relative to the arm 2. The sail 1 in the above state will not resist the wind force. The above sail system thus rotates more easily thereby increasing the rotating force of the wind turbines.

In the above sail system, the sail 1 is pivoted to the tip 2a of the arm 2 at its side 1a by means of a hinge 3, thereby being selectively turned about the arm's tip 2a. That is, the sail 1 pivoted to the arm's tip 2a leans to the outward direction. The sail 1 thus causes the hinge 3 to easily break due to the sail's weight. The sail 1 also easily sags from the arm 2. As the side 1a of the sail 1 is pivoted to the arm's tip 2a by the hinge 3, the side 1a must have a configuration which allows the side 1a to be parallel to the tip 2a and thereby is suitable to be pivoted to the tip 2a. Another problem of the above sail system resides in that the system has a spring 4 which connects the side portion of the sail 1 to the arm's tip 2a so as to prevent the sail 1 from turning exceedingly relative to the arm's tip 2a.

SUMMARY OF THE INVENTION

It is, therefore, an object of the present invention to provide an improved sail system for wind turbines in which the above problems can be overcome and which not only prevents the plate sails, pivoted to the support arm's tips, from sagging due to the sail's weight, it also tightly pivots the sails to the arms regardless of the sail's configurations.

It is another object of the present invention to provide an improved sail system for wind turbines which can rotate about the vertical axis of the wind turbine in a breeze.

It is a further object of the present invention to provide an improved sail system for wind turbines which limits the maximum turning angle of the sails relative to the arms and causes the sails to turn smoothly relative to the arms.

In order to accomplish the above objects, the present invention provides a sail system for wind turbines of the vertical shaft type having a vertical rotating shaft vertically extending from and rotatably held by a support, a plurality of support arms radially extending from an upper portion of the rotating shaft, and a sail pivoted to the tip of each support arm. The above sail is provided with a longitudinal horizontal slit and is eccentrically pivoted to the tip of each support arm by means of a hinge. A holding rod is pivoted to an outside portion of the arm and penetrates the longitudinal slit of the sail. A spring is fitted over the holding rod between the spring stopper of the holding rod and the outer surface of the sail.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
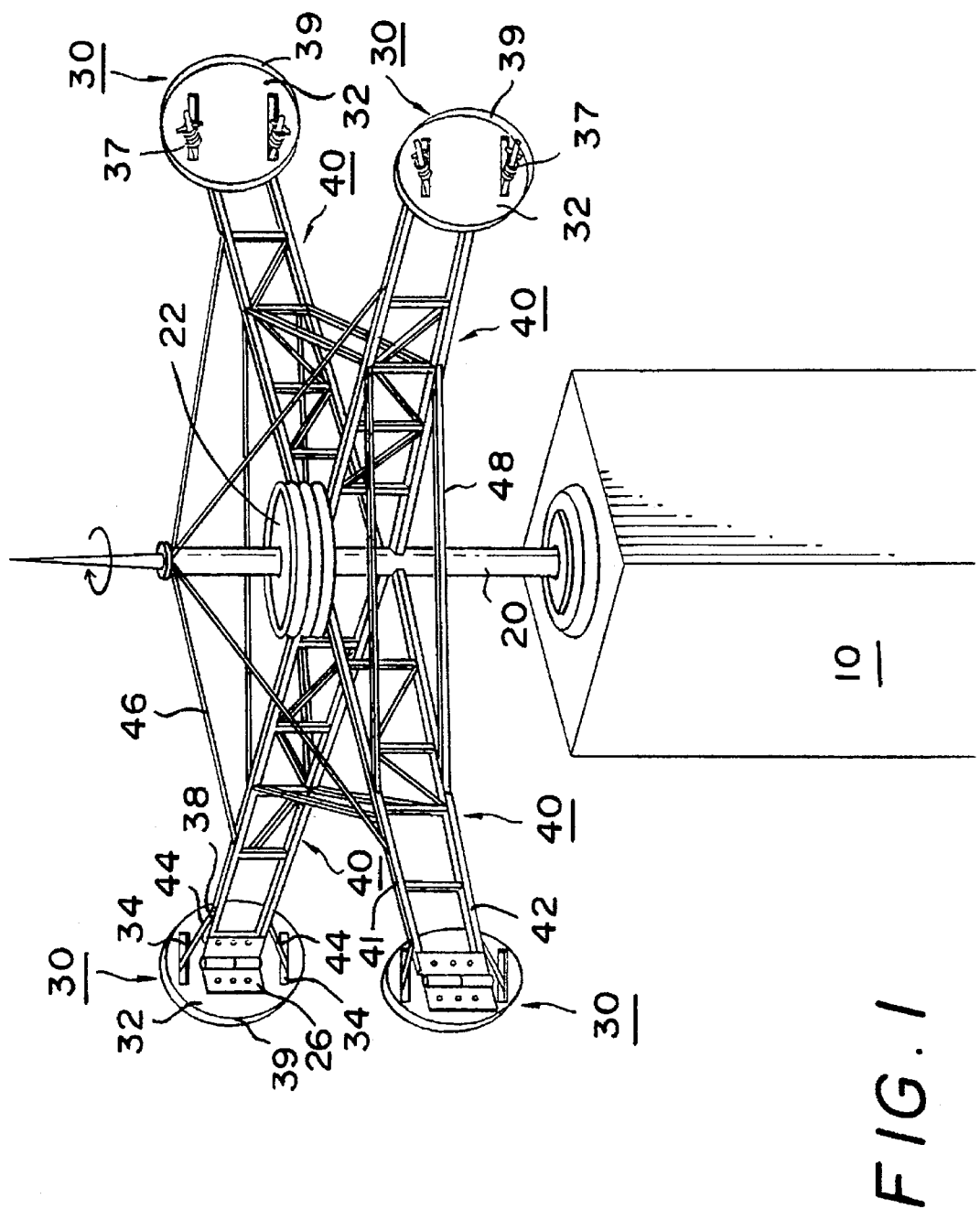
FIG. 1 is a perspective view showing the construction of a sail system for wind turbines of the vertical shaft type in accordance with a preferred embodiment of the present invention.
Figure 2:
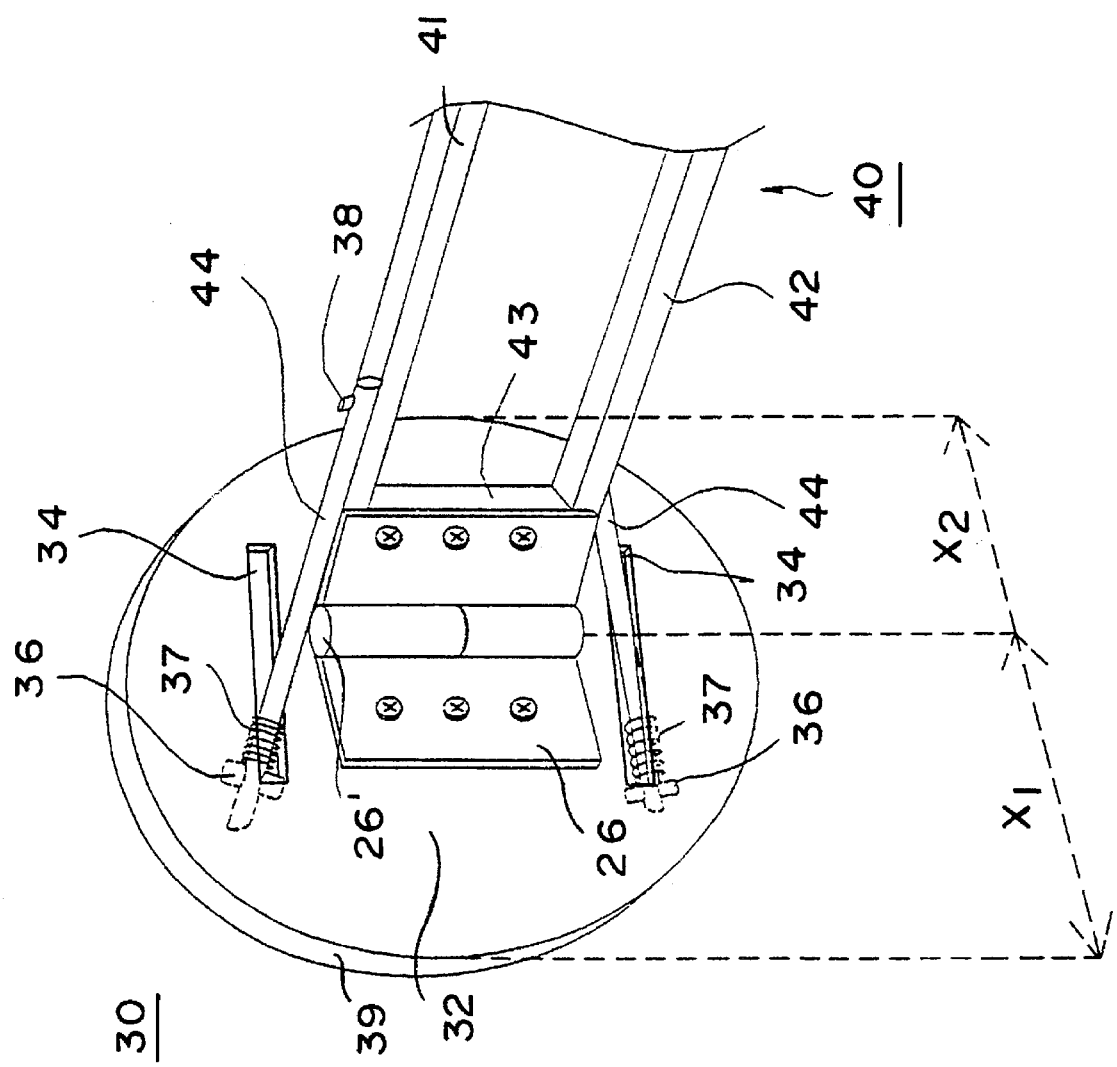
FIG. 2 is enlarged perspective view showing the detailed construction of a pivot joint between one sail and an associated support arm of the sail system's frame of FIG. 1.

FIG. 1 shows the construction of a sail system in accordance with a preferred embodiment of the invention. FIG. 2 shows the detailed construction of a pivot joint between one sail and an associated support arm of a radially extending frame of the above sail system.

As shown in the drawings, the sail system of the invention includes a vertical rotating shaft 20 which vertically extends from the top of a support 10. The shaft 20 is also rotatably held by the support 10. A support wheel 22 is fixedly fitted over the vertical shaft 20 above the top of the support 10. The sail system also includes a plurality of support arms 40 which radially extend outward from both the shaft 20 and the wheel 22. The above arms 40 constitute a sail support frame of the sail system. The sail system further includes a plurality of sails 30 which are pivoted to the tips of the arms 40 respectively.

Each arm 40 comprises upper and lower beams 41 and 42 which are connected together by a plurality of ribs thereby forming a framework. The inside ends of the upper and lower beams 41 and 42 of each arm 40 are fixed to the vertical shaft 20. Vertically extending between and fixed to the tips of the upper and lower beams 41 and 42 of each arm 40 is a hinge mount 43. The inside end portions of the upper beams 41 are fixed to the bottom surface of the support wheel 22 through, for example, welding. The radially extending upper beams 41 are connected together by horizontal reinforcing beams 48 extending between the middle portions of the upper beams 41. In the same manner, the radially extending lower beams 42 are connected together by horizontal reinforcing beams 48 extending between the middle portions of the lower beams 42. In addition, the arms 40 are further supported by a plurality of wire ropes 46 which are tightly stretched from the top portion of the vertical shaft 20 to predetermined portions of the upper beams 41 respectively. With both the horizontal reinforcing beams 48 and the wire ropes 46, the radially extending arms 40 can hold in a strong wind.

Each sail 30 comprises a circular disc 32 which is suitable to concentrate the wind to the center of the sail 30, thereby effectively preventing the sail 30 from being vibrated by the wind. In addition, a flange 39 having a predetermined width vertically extends from the edge of the circular disc 32. With the above flange 39, the sail system of this invention including the sails 30 can easily rotate about the vertical axis of the wind turbine in a breeze. Each circular disc 32 also has a pair of longitudinal slits 34. The longitudinal slits 34 are horizontally formed in the upper and lower portions of each circular disc 32, respectively.

As best seen in FIG. 2, the inner surface of each circular disc 32 is pivoted to the vertical hinge mount 43 of an associated arm 40 by means of a hinge 26. Hence, each sail 30 can turn about the hinge's shaft 26' so as to turn relative to the tip of the arm 40.

The above hinge's shaft 26' is eccentrically positioned on the inner surface of the circular disc 32, so that the sail 30 is eccentrically pivoted to the tip of the arm 40. Thus, when the sail 30 is turned so as to be fully closed relative to the arm 40 and to be directed to the vertical shaft 20 as shown in position C of FIG. 3, the horizontal distance $X_1$ from the hinge's shaft 26' to the inside end of the sail 30 is longer than the horizontal distance $X_2$ from the hinge's shaft 26' to the outside end of the sail 30.

Each arm 40 also includes top and bottom holding rods 44 which are pivoted to the outside portions of the upper and lower beams 41 of 42 of each arm 40 by means of hinge pins 38, respectively. The top and bottom holding rods 44 of each arm 40 penetrate the upper and lower longitudinal slits 34 of an associated disc 32, thereby projecting out of the slits 34. Each holding rod 44 is provided with a spring stopper 36 at its free end portion projecting out of the longitudinal slit 34. A coil spring 37 is fitted over each holding rod 44 between the stopper 36 and the outer surface of the circular disc 32. The sails 30 are thus smoothly turned relative to the arms 40, while the maximum turning angle of the sails 30 is limited by the springs 37.

The operational effect of the above sail system will be described in detail hereinbelow.

Figure 3:
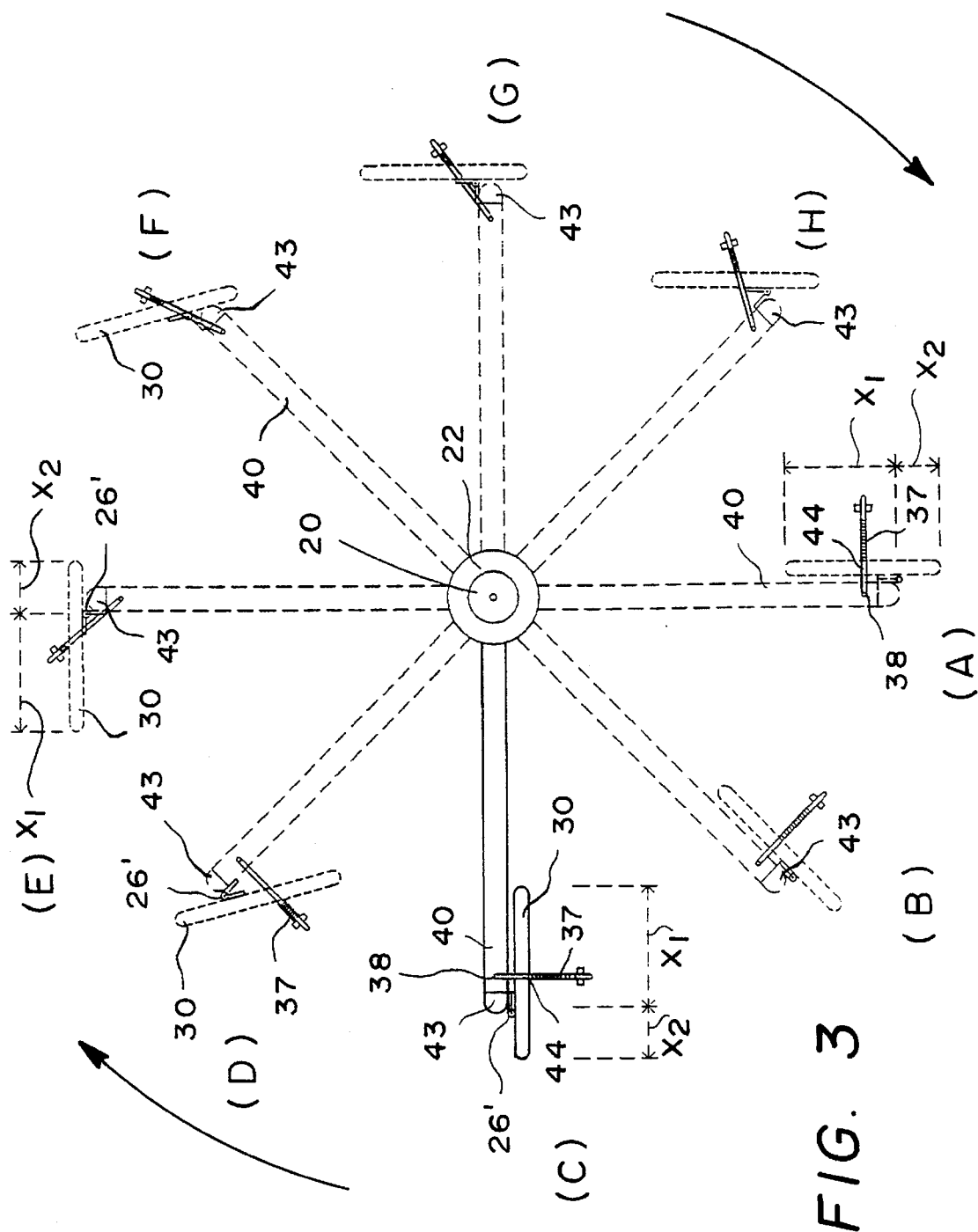
FIG. 3 is a view showing the different positions of one sail turned relative to an associated support arm while the arm is rotated about the vertical axis of the wind turbine.
Figure 4:
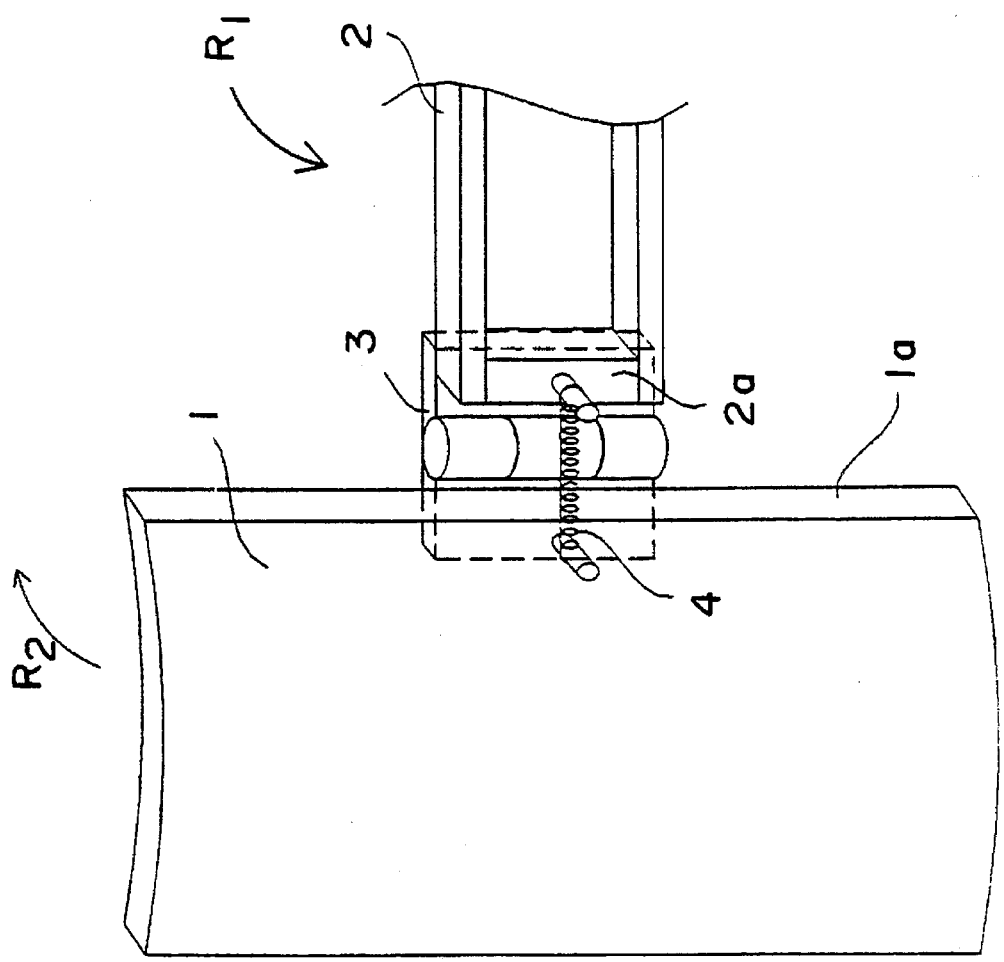
FIG. 4 is a perspective view showing the construction of a typical sail system for wind turbines of the vertical shaft type.

FIG. 3 is a view showing the different positions of one sail 30 turned relative to an associated support arm 40 while the arm 40 together with the vertical shaft 20 is rotated about the vertical axis of the wind turbine.

When the radially extending arm 40 is oriented to be opposite to wind direction W as shown in position A of FIG. 3, the sail 30 pivoted to the arm 40 is fully closed relative to the arm 40 so as to be parallel to the arm 40. The sail 30 in the above state scarcely meets resistance of the wind. Thereafter, the arm 40 with the sail 30 is rotated clockwise about the vertical axis of the wind turbine from the above position A to position C after passing position B. Position B is turned from position A at an angle of 45 degrees, while position C is turned from position A at a right angle. During the above turning motion of the arm 40, the sail 30 is maintained in the fully closed position relative to the arm 40. The outer surface of the circular disc 32 is thus slanted relative to wind direction W while the arm 40 is rotated from position A to position C. As the sail 30 is eccentrically pivoted to the arm 40, the horizontal distance $X_1$ is longer than the other horizontal distance $X_2$ as described above. Therefore, the area corresponding to the longer distance $X_1$ is larger than the area corresponding to the shorter distance $X_2$. In addition, the wind against the outer surface of the sail 30 is thrust in the direction toward the vertical axis 20 while the arm 40 is rotated from position A to position C. Therefore, the sail 30 is maintained in its fully closed position relative to the arm 40 during the turning motion of the arm 40 from position A to position C.

The arm 40 with the sail is, thereafter, rotated from the above position C to position E after passing position D. Position E is turned from position A at an angle of 180 degrees. During the turning motion of the arm 40 from position C to position E, the wind against the sail 30 is thrust in the direction away from the vertical shaft 20. Therefore, the sail 30 during the above turning motion of the arm 40 is gradually turned about the hinge's shaft 26 while compressing the coil springs 37, thereby being opened relative to the arm 40 as shown in position D of FIG. 3. At position E, the sail 30 has been almost turned relative to the arm 40 at a right angle. The sail 30 in the above position E exposes its inner surface to the wind, thereby rotating the arm 40 toward a position F.

While the arm 40 is rotated from position E to position F, the arm 40 goes into the wind. Therefore, the sail 30 meets resistance of the wind and intends to be opened parallel to wind direction W. However, one side of the sail 30 in the above state comes into contact with the hinge mount 43 of the arm 40 thereby stopping the turning motion of the sail 30. That is, the turning angle of the sail 30 relative to the arm 40 is limited to a predetermined angle, thus promoting the turning motion of the arm 40. In the present invention, it is preferred to set the maximum turning angle of the sail 30 relative to the arm 40 as an angle of 120 degrees.

The arm 40 in turn is rotated from position F to original position A after passing positions G and H. Positions G and H are turned from position A at angles of 270 and 315 degrees, respectively. During the turning motion of the arm 40 from position G to position A, the sail 30 is opened parallel to wind direction W thereby scarcely meeting resistance of the wind.

Of course, it will be understood that the turning angle of the sail 30 relative to the arm 40 may be adjusted by changing the elastic modulus of the spring 37 fitted over the holding rod 44 between the stopper 36 and the outer surface of the sail 30.

As described above, the present invention provides a structurally improved sail system for wind turbines of the vertical shaft type. In the above sail system, each sail is eccentrically pivoted to an associated arm, which radially extends from the vertical shaft of the wind turbine, by means of a hinge. In addition, the sail is also held by a pair of holding rods. The hinge thus cooperates with the holding rods to support the weight of the sail differently from the prior art sail system. In this regard, the sail system not only prevents the hinge from being broken by the weight of the sail, it also prevents the sail from sagging. During the turning motion of the sail relative to the arm, one side of the sail comes into contact with the tip of the arm, thereby limiting the maximum turning angle of the sail. The sail system also includes a spring which is fitted over each holding rod between a spring stopper formed on the holding rod and the outer surface of the sail. The above spring allows the sail to be smoothly turned relative to the arm.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sail system for wind turbines, comprising:
    a) a support;
    b) a vertical shaft rotatably held by said support;
    c) a plurality of support arms radially extending from said shaft, each of said support arms having a tip portion;

d) a hinge operably secured to each said tip portion;

e) a sail pivotably secured to each respective said tip portion through each respective said hinge;

f) at least one longitudinal slit horizontally formed in either the upper or lower portion of each said sail;

g) a holding rod pivotably secured to each said arm, said rod extending through said at least one slit of the respective said sail, each said holding rod having a stopper at its free end portion projecting out of said at least one respective longitudinal slit; and h) a spring fitted over each said holding rod between each said respective stopper and each said respective sail.

2. A sail system as in claim 1, wherein:

a) each said sail includes a circular plate.

3. A sail system as in claim 2, wherein:

a) each said plate includes a flange.

4. A sail system as in claim 1, wherein:

a) each said sail is eccentrically secured to each said hinge.

* * * * *